US012582987B2

(12) United States Patent
Mazhar et al.

(10) Patent No.: US 12,582,987 B2
(45) Date of Patent: Mar. 24, 2026

(54) CARRIER DEVICE FOR A DISPENSING DEVICE

(71) Applicant: DISPENDIX GMBH, Stuttgart (DE)

(72) Inventors: Umair Mazhar, Stuttgart (DE); Tristan Ashman Höfle, Stuttgart (DE)

(73) Assignee: DISPENDIX GMBH, Stuttgart (DE)

( * ) Notice: Subject to any disclaimer, the term of this patent is extended or adjusted under 35 U.S.C. 154(b) by 178 days.

(21) Appl. No.: 18/706,865

(22) PCT Filed: Oct. 26, 2022

(86) PCT No.: PCT/EP2022/079880
§ 371 (c)(1),
(2) Date: May 2, 2024

(87) PCT Pub. No.: WO2023/078748
PCT Pub. Date: May 11, 2023

(65) Prior Publication Data

US 2025/0033047 A1 Jan. 30, 2025

(30) Foreign Application Priority Data

Nov. 6, 2021 (LU) ........................................ 500832

(51) Int. Cl.
*B01L 3/00* (2006.01)

(52) U.S. Cl.
CPC ....... *B01L 3/50273* (2013.01); *B01L 2400/02* (2013.01); *B01L 2400/0487* (2013.01); *B01L 2400/0622* (2013.01)

(58) Field of Classification Search
CPC ............. B01L 3/50273; B01L 2400/02; B01L 2400/0487; B01L 2400/0622;
(Continued)

(56) References Cited

U.S. PATENT DOCUMENTS

2006/0078473 A1* 4/2006 Murakami ............ F04B 19/006 422/400
2010/0265287 A1* 10/2010 Govyadinov ........ B41J 2/04586 250/573

(Continued)

FOREIGN PATENT DOCUMENTS

JP 2022020665 A * 2/2022 ........ B01L 3/502707
WO 2017/151516 A1 9/2017

OTHER PUBLICATIONS

Search Report and Written Opinion (With Cover Letter) for LU500832, provided by the Luxembourg Intellectual Property Office on Jun. 29, 2022.

(Continued)

*Primary Examiner* — Christopher R Demeree
(74) *Attorney, Agent, or Firm* — Hodgson Russ LLP

(57) ABSTRACT

The invention relates to carrier device (1) for a dispensing device (2), wherein the carrier device (1) comprises a plurality of holes (3) that are arranged along grid lines (4) of a Cartesian coordinate system (10) x,y-coordinate grid structure (5), a plurality of detection devices (6) for detecting whether a dispensed liquid falls through a hole (3), wherein the detection device (6) comprises a wave source unit (7) for emitting a wave and a wave receiver unit (8) for receiving the emitted wave wherein at least two detection devices (6) are arranged along a line (9), wherein the detection devices (6) are arranged such that an angle between the line (9) and a grid line (4) of the grid structure is between 35° to 55°, in particular between 40° to 50°, preferably 45° and/or the detection devices (6) are arranged such that the at least two detection devices (6) are arranged, in particular alternatingly, offset in a Cartesian coordinate system (10) z-coordinate direction.

20 Claims, 10 Drawing Sheets

(58) Field of Classification Search

CPC ........... B01L 220/061; B01L 2200/143; B01L 2300/0654; B01L 3/0241; B01L 2200/10; B01L 2300/0816; B01L 2300/0819; B01L 2300/0829; B01L 2300/0867; B01L 3/502715; B01L 3/502784; B01L 2300/0893; B01L 2400/0496; G01N 35/1009; G01N 21/3563; G01N 33/48; B01F 2101/23; B29L 2031/752

USPC .................... 222/136; 250/573, 574, 227.11; 422/400; 506/27

See application file for complete search history.

(56) References Cited

U.S. PATENT DOCUMENTS

2011/0092392 A1* 4/2011 Colston, Jr. ........... B29C 45/006 506/40
2018/0067142 A1 3/2018 Klinger et al.

OTHER PUBLICATIONS

Search Report and Written Opinion of the International Searching Authority (ISA) for PCT Application PCT/ EP2022/079880, provided by the European Patent Office on Jan. 24, 2023.

* cited by examiner

CARRIER DEVICE FOR A DISPENSING DEVICE

The invention relates to a carrier device for a dispensing device Additionally, the invention relates to a dispensing device for dispensing a liquid comprising the carrier device and a source carrier comprising the carrier device. Furthermore, the invention relates to a method for detection, counting and verification of at least one droplet for each individual position originating from at least one hole of a carrier device and the use of the carrier device.

Drop-on Demand technology has developed over the years to fulfill the need for optimized non-contact liquid handling and analysis tasks in modern life science laboratories. Modern diagnostic devices for life science purposes are required to analyze up to thousands of adjacent probes on microarrays or micro plates at a fast pace. The micro plates used for these analyses are commonly made of injection molded disposable polypropylene or polystyrene. The micro plates are available in various designs and sizes in particular regarding volume and number of wells. Well numbers range conventionally range from 96, 384 to even 1536 wells. Drop on demand technology systems use individually controlled pressure channels to generate droplets of different volume from a small hole at the bottom of at least one well. This technology enables droplets to be dispensed into a target plate. In particular in biotechnology, sample sizes are in addition often small. This can be due to expensive substances, rare substances or dangerous to handle samples. In addition, there is a need for fast automated analyses and elimination of carryover and cross-contamination. The drop-on demand technology is particularly relevant for high-throughput screening assays (HTS) or workflows. The high-quality design of HTS assays is critical in HTS experiments. In view of the need for fast automation and elimination of contamination, the development of high-quality HTS assays requires the integration of both experimental and computational approaches for quality control. The most important aspects to be considered for a high quality HTS assay or workflow are (i) good plate design, (ii) the selection of effective positive and negative chemical/biological controls, and (iii) the development of effective quality control metrics and processes to measure the degree of differentiation so that assays with inferior data quality can be identified. A good plate design helps to identify systematic errors (especially those linked to well position) and determine what normalization should be used to remove/reduce the impact of systematic errors on both quality control and hit selection. A clear distinction between a positive control and a negative reference such as a negative control is an index for good quality. In addition, many quality-assessment measures have been proposed in the prior art to measure the degree of differentiation between a positive control and a negative reference. Thus, reliable detection, differentiation between well positions, verification of droplets and prevention of cross-contamination in HTS assays or workflows are critical for reliable screening results.

Conventional methods and appliances for drop-on demand analysis are known in the art. DE 10 2007 041 071 A1 is directed to providing an apparatus and a method by which small, variable volumes of liquid, which are produced independently of one another, individually or may be applied directly onto the carrier or to freely selectable positions on sample holders at the same time without any cross-contamination. For this purpose, DE 10 2007 041 071 A1 provides a device for holding liquids and a device for applying liquids to sample carriers comprising a holder for a device for receiving a liquid, said apparatus comprising one or more wells, the bottom of at least one, several or all wells has at least one bore and designed at least one of the bores in such a manner that the capillary pressure in the respective bore is greater than the pressure producible by the fluid pressure in the respective recess, means for generating a pressure pulse, a holder for at least one sample carrier, at least one movement device for moving a device for receiving a liquid and/or traversing means for moving a device for generating a pressure pulse and/or a traversing means for moving a support for at least one sample carrier, wherein said means for generating a pressure pulse above and the mount is arranged for at least one sample support below the holder for the device for receiving a liquid, and wherein said means for generating a pressure pulse having a quick-acting valve for generating the pressure pulse.

In addition to the above needs, it is desirable to confirm that a droplet has actually been dispensed in the target carrier.

DE 10 2016 215 240 B3 is directed to providing a method and means for automated, recurring dispensing of liquid drops or liquid jets in parallel multichannel systems, the type and quality of the dispensed liquid being continuously checked automatically and, if necessary, being able to be compensated for a desired value. In order to achieve this goal DE 10 2016 215 240 B3 discloses a device for the optical control of liquid drops or jets intermittently dispensed on multichannel microdosing devices, comprising: at least one of each dosing channel of the microdosing device assigned to each dosing channel and each directly on a common carrier arranged light barrier unit, each consisting of a light source with inhomogeneous beam profile and light sensor with a sensor surface on which the profiled light beam of the light source is projected, the profiled light beam runs transversely to the direction of propagation of the dispensed liquid drops or jets and is wider than the liquid drop or jet to be controlled.

The downside of the known carrier arranged light carrier units is that said light carrier units require substantial space for mounting and reduced resolution at micro plate volumes greater than 96 wells, which thus limits their use to smaller micro plates of 96 wells.

The object of the invention is therefore to provide a carrier device which allows for the reliable and fast detection of a droplet, in particular a droplet verification drop-on demand applications, which can be used with a wider variety of micro plate volumes and sizes compared to existing solutions, which in particular allows for the use of at least 384 wells micro plates to make high throughput screening (HTS) analysis, sample workflow and handling even more efficient compared to existing solutions.

The object is solved by a carrier device according to claim 1. In particular, the object is solved by a carrier device for a dispensing device, wherein the carrier device comprises a plurality of holes that are arranged along grid lines of a Cartesian coordinate system x,y coordinate grid structure. The carrier device comprises a plurality of detection devices for detecting whether a dispensed liquid falls through a hole, wherein the detection device comprises a wave source unit for emitting a wave and a wave receiver unit for receiving the emitted wave. At least two detection devices are arranged along a line, in such a way that the detection devices are arranged such that an angle between the line and a grid line of the grid structure is between 35° to 55°, in particular between 40° to 50°, preferably 45°. Additionally or alternatively, the detection devices are arranged such that the at least two detection devices are arranged, in particular alternatingly, offset in a z coordinate direction of the Cartesian coordinate system.

Thanks to the carrier device according to the invention, it is possible to increase the capacity of micro plate arrays, in particular having a standardized geometry, in particular in its outer contour, to dispense from four times more source positions as compared to the existing solutions and thus make the droplet detection and in particular verification thus more efficient. Existing solutions as described in exemplary form in DE 10 2016 215 240 B3 require comparatively more space on the carrier to be allocated to the detection devices based on the geometry of the light barrier unit and its positioning, thus limiting the known solutions to 96 wells for drop-on demand applications. The carrier according to the invention allows for a miniaturization of the detection devices and arrangement of the same on the carrier device with higher density compared to the known solutions. The inventive carrier device thus allows for the precise detection, count and verification of droplets coming from each individual position out of at least individual 384 positions, thereby making high throughput screening (HTS) analysis, sample workflow and handling even more efficient compared to the existing solutions.

In the embodiment in which the detection devices are arranged offset in z coordinate, a first detection device is arranged on a first carrier device surface that faces towards the dispensing head of the dispensing device and a second detection device is arranged on a second carrier device that faces towards a target carrier into which the liquid is dispensed.

The detection devices can be arranged alternatingly to each other. That means, that along a grid line a first detection device is arranged on the first carrier device surface and a second detection device that is arranged adjacent to the first detection device along the grid line is arranged on the second carrier device surface. It is also possible to arrange the detection devices in a different, predetermined pattern allowing for a constructively easy adjustment for example to mounting space requirements.

The grid stricture is formed by a plurality of, in particular imaginary, grid lines. In particular, the grid lines can be parallel to each other and extend along a x-direction. Further grid lines can be parallel to each other and extend along a y-direction. The grid lines and further grid lines can intersect each other in an angle, in particular 90°.

According to an embodiment at least two further detection devices can be arranged along a further line, wherein the line and the further line are parallel to each other. The carrier device can for example comprise at least two holes which are arranged along the line. In addition or alternatively, the carrier device can be configured such that no detection device is arranged along a grid line. In other words, there can be a gap in a sequence of detection devices along the grid line. Additionally or alternatively, the detection devices are forming a regular or an irregular pattern along the grid structure. The same applies to any further line.

Additionally, the holes of the carrier device can be arranged in a grid portion of a carrier wherein a circumferential border of the grid portion is formed by the holes. The grid portion can optionally have a rectangular shape. Additionally or alternatively, the grid line or grid lines are oriented in parallel to a respective grid portion. This allows for optimized use of space on the carrier device.

In a further embodiment, the wave source unit emits non-visible waves. Additionally or alternatively, the waves emitted by the wave source unit comprises a wavelength between 780 nm to 1000 nm, in particular 850 nm to 950 nm, preferably 900 nm. This has the advantage that a droplet is even more accurately detected in that spectral range. Additionally, near-IR light has proved ideal for analysis for biologics due to reduced absorption in this spectral range. This is due to the fact, that IR light has the lowest energy and therefore is least destructive to living cells or light sensitive compounds.

In a further embodiment, the carrier device according to the invention can be a printed circuit board. This allows for a compact size and volume of the carrier device while using a relatively low-cost mass-producible, is easily re-workable and widely available printed circuit board. In addition, the design of the printed circuit board can be easily adjusted to the needs of the carrier device and/or the dispensing device. The printed circuit board can in addition also mechanically support the carrier device according to the invention.

In a further embodiment, the carrier device according to the invention can comprise an electrical component portion comprising at least one, in particular several, electrical component(s) wherein the electrical component portion is arranged adjacent to a grid portion of the carrier. Additionally or alternatively, no other electrical component than the detection device is arranged in the grid portion. This allows for a further compact design of the carrier device according to the invention.

The carrier device can further comprise an electrical connector and a through hole, wherein the electrical connector is connectable to the dispensing device, in particular a control unit of the dispensing device. Additionally or alternatively, the electrical connector partly protrudes into the through hole. The through hole allows for the easy establishment of a plug-and-socket connection; for example, for a connection of a connector such as a cable with the control unit of the dispensing device.

In a further embodiment, the carrier device can comprise a further electrical connector wherein the further electrical connector is arranged such that it is accessible from a carrier side, that is opposite to another carrier side that faces towards the dispensing head. The carrier side can face towards a target carrier into which the liquid can be dispensed.

Additionally or alternatively, the further electrical connector is connectable to another control unit. This has the further advantage, that for example a connection cable can be easily connected to the carrier device to facilitate direct transfer of data to an external device, such as a computer. This allows for safe, efficient and fast data transfer and monitoring of an HTS assay or workflow. A user therefore can for example easily connect his computer or another electronic device to the bottom or underside of the control unit, in particular the printed circuit board, without having to remove the control unit or printed circuit board to establish a connection. This is in particular interesting for developers for debugging and testing purposes or for maintenance and updating purposes. Preferably pogopins are used as the electrical connector for optimized and safe use of mounting space in particular in automated HTS workflows, where small size and volume of all components in preferred.

The carrier device can further comprise a carrier element wherein said carrier element comprises at least one grasping portion wherein the grasping portion is arranged at a border of the carrier. Additionally or alternatively, the grasping portion corresponds with an indentation of the carrier. This has the advantage of allowing for the easy handling in an HTS assay or workflow. It allows in particular easy automated handling, such as by way of a robotic gripper or robot arm for transporting the carrier device. The carrier element is configured to carry the electrical components of the carrier device. Additionally or alternatively, the carrier element has the grid portion discussed above.

In a further embodiment, the carrier device comprises a cover device for covering a part of the carrier element. Alternatively, the carrier device comprises a cover device for covering a part of the carrier element wherein the cover device comprises several through holes that are arranged coaxially to the holes of the carrier element when the cover device is arranged on the carrier. The cover device can comprise at least one recess for receiving the detection device. In particular, the cover device comprises at least one recess wherein the detection device is arranged in the at least one recess when the cover device is arranged on the carrier element. The cover device can comprise a first recess for receiving the wave source unit and a second recess for receiving the wave receiver unit. The recess can be opened towards the carrier element and/or the cover device can comprise a recess wall separating the recess from a well carrier unit.

Such a cover device allows for even more improved detection accuracy by ensuring that a detection device does not receive a signal of another emitting source, such as from another detection device, which could lead to false droplet detection or verification data. The cover device thus allows in an easy way to ensure that a detection device only reports the signal corresponding to a droplet passing through the detection device. It is no longer needed to have holes in the covers, as is known from conventional solutions. These holes in commonly known solutions allow for a user to see light for detection when a wavelength in the visible spectrum is used. The need for human supervision of the wells is no longer necessary as a control. This visual control is rather inaccurate due to the preferred high number of wells on a plate. In addition, the exclusion of the visual control of the known solutions, has a risk of contamination and the cover device further improves the overall detection accuracy by excluding interference of detection devices of neighboring holes. The cover device can be a 3D-printed device with fused deposition modeling (FDM) or preferably stereolithography (SLA) printing technology with high resolution.

In another embodiment, on the carrier device according to invention, the number of holes can be between 96, in particular more than 96, and 1536, in particular 384 holes.

According to one aspect of the invention, a source carrier comprising a carrier device according to the invention is provided, wherein the source carrier comprises a carrier through hole for receiving an electrical connector, in particular corresponding to and/or being coaxially arranged with a through hole of the carrier device. This allows for an easy connection to a further control unit, in particular to easily connect the carrier device with the control unit of the dispensing device. The corresponding through holes allow for optimized mounting and connecting space. Thereby, the inventive carrier device can communicate with the dispensing device.

According to one aspect of the invention, a dispensing device for dispensing a liquid is provided comprising a source carrier for receiving a well carrier unit, a dispensing head for applying a pressure to the well carrier unit for dispensing liquid and a carrier device according to the invention. The dispensing head can generate a pressure impulse and cause the system to dispense liquid droplets from the dispensing wells. For example, the dispensing head can comprise a pneumatic system with corresponding actuators and valves can be used for this purpose. Advantageously, each dispensing well can be provided with a corresponding valve for a parallel dispensing of the liquid. Also, a control unit can independently regulate each valve and a dedicated algorithm for generating a controlled dispensing of the drops can be employed. For example, to increase the precision in the dispensing process, the pressure in the dispensing well can be continuously measured so that the pressure and turn-on time of each valve can be adjusted for each impulse with a target/actual performance comparison. The generation of the droplets can be between 90 Hz and 110 Hz, preferably 100 Hz.

The dispensing head for dispensing liquid located in the well is moveable relative to the holder and/or to the inventive apparatus and/or inventive system. For this purpose, the dispensing device can employ a Cartesian coordinate robot provided with a motor to move the dispensing head.

Dispensing devices for dispensing fluids as such are known. Said dispensing devices can use either air pressure or positive displacement to dispense fluids in a controlled way. Air pressure-based dispensing devices use air pressure that is outputted by an air compressor or a similar device and push on a piston or piston-like component that in turn push a fluid in a barrel out of the nozzle. Positive displacement dispensing devices on the other hand do not use compressed air. They usually push a piston inside a barrel by means of a mechanical force that can be generated by electric stepper motors. They are ideal for instance for fluids that change viscosity over time generally and for precise control of flow rate and volume of the dispensed fluid.

A dispensing device setup is generally known to comprises a dispensing head used for dispensing a liquid sample located in a well. The well is carried by a well carrier that is arranged in a receiving means of the dispensing device. The well carrier unit is usually formed as a so called multi well plate or device and comprises a plurality of wells that are arranged in a matrix shape. After liquid is inserted into the wells the dispensing head is moved to a dispensing position in which the dispensing heads applies a pressure into the well so that the liquid is dispensed into a target carrier that is usually arranged below the well carrier unit. The dispensing head can be configured such that liquids from several wells can be dispensed at the same time. After the dispensing head dispensed the liquid from the well or wells it is moved in another dispensing position in which it dispenses liquids from other wells.

A well is a fluid reservoir with the outlet opening at its bottom, through which liquid can be dispensed out of the well. The well is capable of holding and releasing a liquid sample onto a target plate only when a well-defined pressure pulse is applied on top of the well. As mentioned before the pressure pulse is provided by a dispensing head of a dispensing device. When there is no pressure pulse applied on the well, no liquid sample is released since capillary forces keep the liquid sample in the cavity. A well can be made out of polymers (e.g., polypropylene), metals (e.g., aluminium, copper) and/or glass. The dimensions of the wells are standardized and known.

In an embodiment in which the well carrier has 96 wells or less than 96 wells, the well can be arranged in the through hole of the well carrier in a releasable manner. That means, the connection between the well and the well carrier can be disconnected without destroying the well and/or the well carrier. Additionally, the well can be inserted into the through hole or removed from the through hole without the use of any tools.

In an embodiment in which the well carrier has more than 96 wells, in particular, 384 wells, the well carrier has through well wherein at one end of the well carrier a foil is attached. Said foil forms the end of the well carrier and has an opening. That means, the foils has at least 384 outlet openings if the well carrier is a well carrier with 384 wells. The other end of the well carrier is open so that liquid can be inserted via said end into the well carrier. In the following, if it is not explicitly mentioned, the use of the expression "well carrier" means that one of the two aforementioned well carrier is meant.

If the well carrier unit is arranged in a dispensing device, when a pressure pulse is applied on top of the well a liquid droplet or a liquid jet is released on a target carrier arranged below the well carrier unit.

The outlet opening of the well can have a diameter between 60 μm (micrometer) and 200 μm, in particular 100 μm. The dispensed liquid sample can be a liquid droplet or a liquid jet and/or have a volume of at least 10 nanoliters. Larger volumes are achieved by applying up to 100 pulses per second on the well. The maximum volume of the dispensed liquid per well is the well volume. The well can have a volume between 80 microliters to 500 microliters.

The well carrier unit can have one or more wells. Well carrier units that have more than one well are also indicated as multi well plates. In particular, well carrier units are known that have 6, 12, 24, 48, 96, 384, 1536 and 3456 wells. In this invention 96, in particular more than 96, to 1536 and in particular 384 wells are preferred. The wells are arranged in a matrix structure on the well carrier unit, in particular in the through holes of the carrier.

In an embodiment, the carrier device is arranged at a side of the source carrier that is opposite to the dispensing head of the dispensing device. In said embodiment the well carrier unit can be arranged, in particular directly, on the carrier device.

The dispensing device according to the invention can dispense multiple liquid classes on demand, including aqueous solutions, DMSO (up to 100%) and glycerol (up to 50%), oligos, enzyme buffers, PCR buffers, Genomic DNA, and cells suspended in Matrigel, BME or EHS Matric, all commercial names for membrane-like matrices working as a cell-substrates comprising biomolecules suitable for 3D cell cultures and tissue engineering.

In an embodiment of the dispensing device, the carrier device is arranged in a recess of the source carrier. Alternatively, the carrier device is arranged in a recess of the source carrier such that the carrier device is arranged flush with the source carrier.

In an embodiment of the dispensing device the source carrier comprises a carrier through hole for receiving the well carrier unit. Alternatively, the source carrier comprises a carrier through hole for receiving the well carrier unit wherein the well carrier unit is in contact with the carrier device when the well carrier unit is arranged in the carrier through hole.

In an embodiment of the dispensing device, the source carrier is configured to be moveable. Additionally or alternatively, the dispensing head is configured to be moveable.

In an embodiment of the dispensing device, the dispensing device comprises the well carrier unit, which comprises a well for receiving liquid comprising an inlet opening for inserting liquid and an outlet opening for dispensing liquid.

In another aspect of the invention, a source carrier is provided for an inventive dispensing device, comprising a carrier device according to the invention, wherein the source carrier comprises a through hole for receiving an electrical connector, in particular corresponding to a through hole of the carrier device.

In another aspect of the invention, a method for detection and/or counting and/or verification of at least one droplet originating from at least one hole of a carrier device is provided. The method comprises for each position of a hole of the carrier device the steps of identifying changes in light intensity to detect droplets, counting the number of droplets and/or verifying the droplets. The method comprises the further steps of communicating a signal to a control unit and optionally out-putting results in computer readable format. The results are preferably configured to be displayable in color-coded format.

The carrier device is preferably arranged in a dispensing device for dispending liquid according to the invention. The method can further comprise performing a dispensing operation by means of the dispensing device for dispensing liquid located in the well. In a further optional step of the method, a destination tray has XY mobility and thus in a sample picking of pooling step can be moved such that samples can be picked or pooled from a source carrier to the destination tray as predetermined by a user.

The method can further comprise a step of de-ionization control of the at least one droplet or an entire dispensing area or region. The step can also comprise deionizing the complete carrier device and the target carrier. The method can optionally further comprise a humidity control step. Additionally, or alternatively, the method can further comprise a temperature control step. The method can further comprise a step of data communication, in particular via a gateway connectivity, in particular an IOT gateway or ethernet gateway.

In a further aspect of the invention, the use of a carrier device according to the invention in a dispensing device for dispensing liquid, in particular a dispensing device according to the invention, in particular in at least one of non-contact analytics, genomics and proteomics, CRISPR reactions, Covid 19-monitoring or identification, High-throughput screening (HTS) protocols, High-throughput screening indexing, genomic surveillance, synthetic biology analysis and cell dispensing.

In the figures, the subject-matter of the invention is schematically shown, wherein identical or similarly acting elements are usually provided with the same reference signs.

FIG. 1 shows a schematic representation of a dispensing device with a dispensing head.

FIG. 2*a* shows a perspective representation of a carrier device according to an embodiment of the invention.

FIG. 2*b* shows an enlarged part of the grid portion of FIG. 2*a*.

Figure 1:
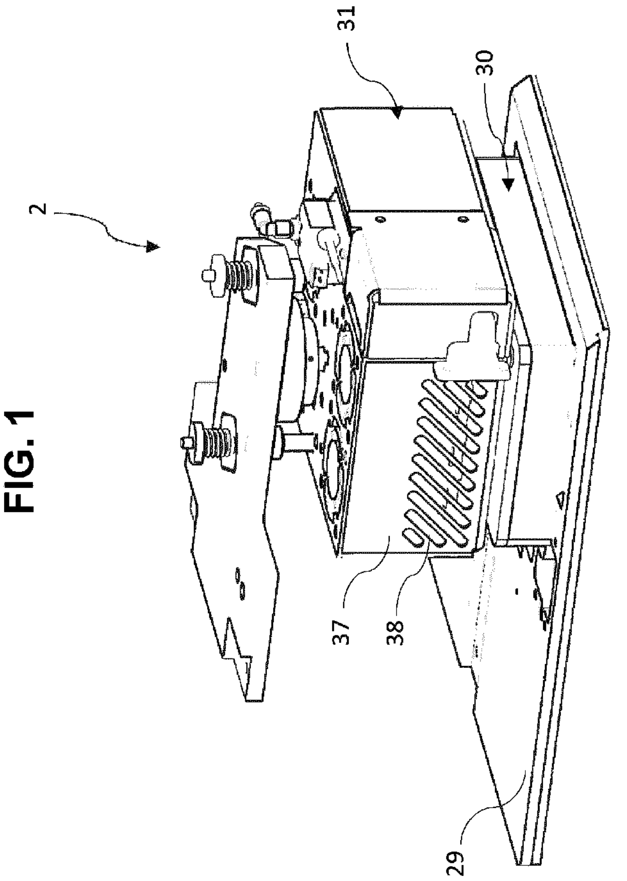

FIG. 1 shows a schematic representation of a dispensing device 2 with a dispensing head 31. The dispensing device 2 is configured for dispensing a liquid located in a well of a well carrier unit 30 that is arranged in a carrier through hole 19 of a source carrier 29. The dispensing device 2 comprises the dispensing head 31. The dispensing head 31 is configured to dispense the liquid located in the well (not shown in the figure). Thereto the dispensing head 31 comprises a pneumatic system (not shown in the figure) by means of which at least one well or several wells (not shown in the figure) of the well carrier unit 30 can be provided with an impulse pressure that causes the liquid to drop from an outlet opening of the respective well (not shown in the figure) into a target carrier (not shown in the figures) arranged below the source carrier 29.

Also, the dispensing device 2 comprises the source carrier 29, to which the well carrier unit 30 is mounted in a detachable manner and the dispensing head 31 is moveable relative to the source carrier 29 by means of a motor system (not shown in the figure). In particular, the dispensing head 31 can be moved relative to the well carrier unit 30 so that the liquid of different wells can be dispensed in sequence.

In order to avoid an overheating of the components inside the dispensing head 31, at least a cooling fan (not shown in the figure) is located in a housing 37 of the dispensing head 31. Advantageously, a lateral surface of the housing 37 is provided with a grid 38.

Figure 2A:
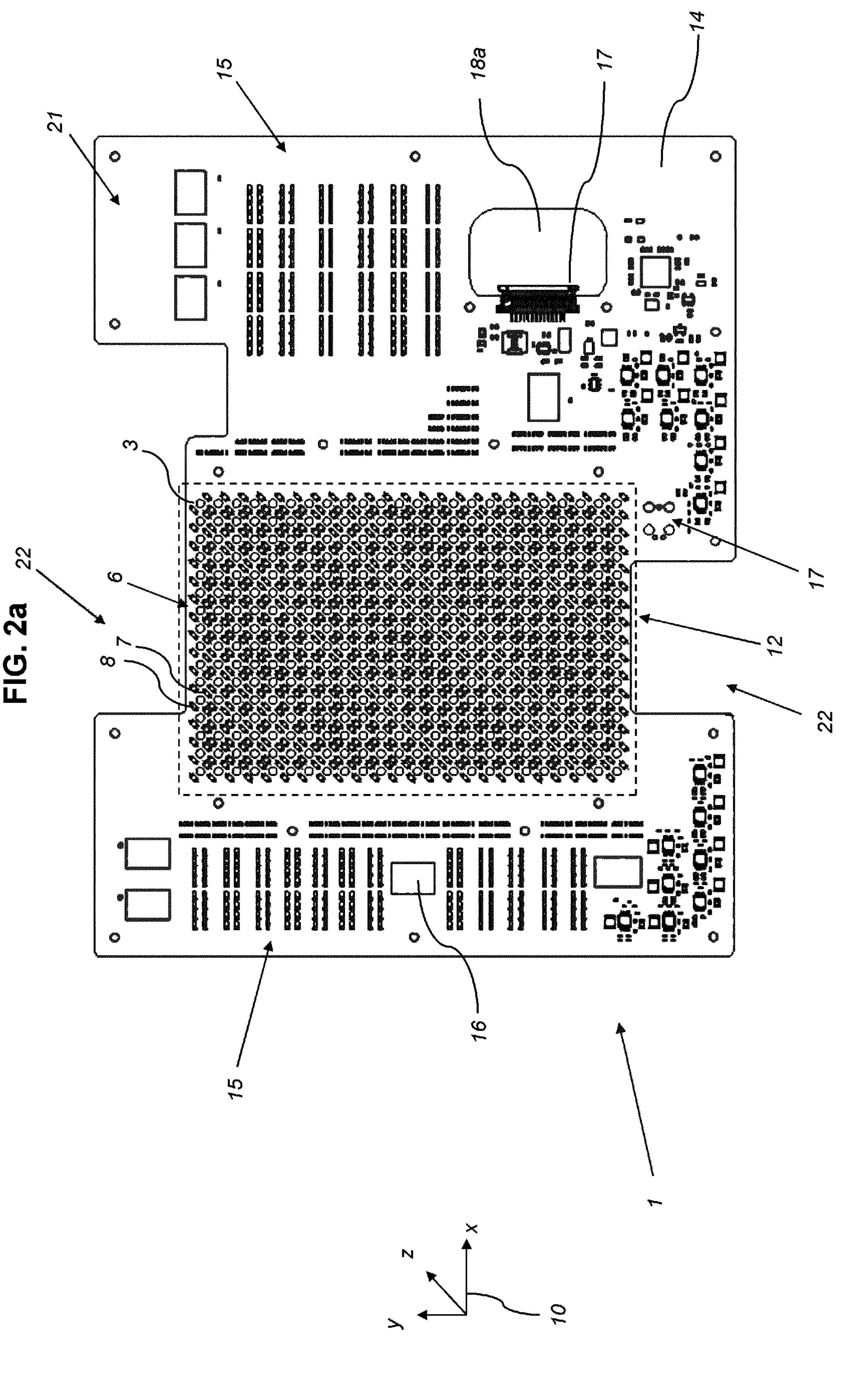
Figure 2B:
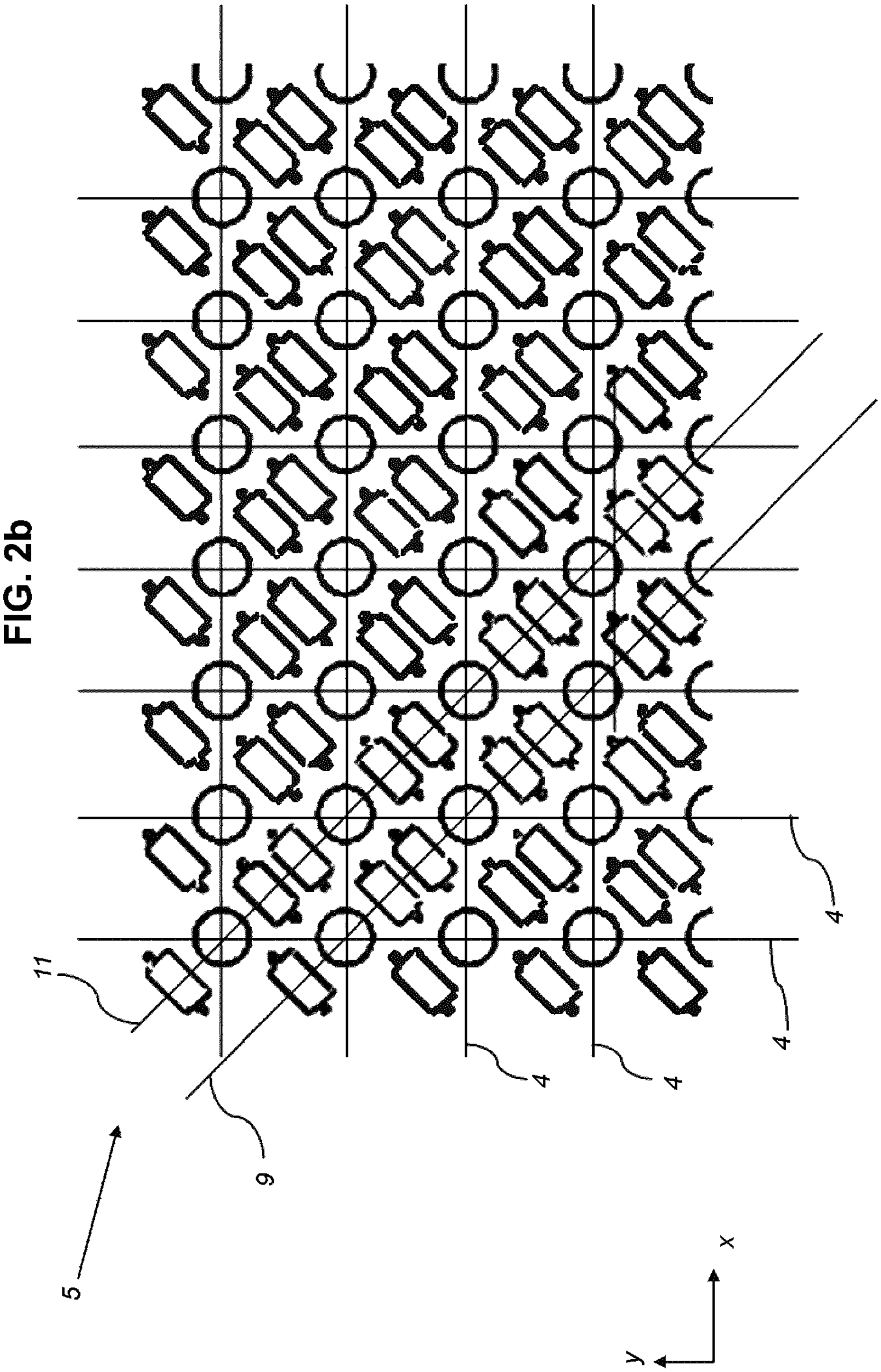

FIG. 2*a* illustrates a perspective representation of a carrier device 1 according to an embodiment of the invention and FIG. 2*b* shows an enlarged part of a grid portion 12 of the carrier device 1. Said carrier device 1 is attached to the source tray 29 shown in FIG. 1. In particular, the carrier device 1 is attached to the source tray 29 on a side of the source tray 29 that is distant from the dispensing head 31.

The carrier device 1 for a dispensing device 2 comprises a plurality of holes 3 that are arranged along grid lines 4 of a Cartesian coordinate system 10 x,y-coordinate grid structure 5. The carrier device 1 further comprises a plurality of detection devices 6 for detecting whether a dispensed liquid falls through a hole 3 of the carrier device 1. The detection device 6 comprises a wave source unit 7 for emitting a wave and a wave receiver unit 8 for receiving the emitted wave. The detection device 6 thus functions as a wave barrier, in particular a light barrier, which detects a droplet crossing the same. The holes 3 and the detection devices 6 are arranged in a grid portion 12 of the carrier device 1. The grid portion 12 is indicated by the dotted lines in FIG. 2*a*.

As is shown from FIG. 2*b* the grid structure 5 is formed by a plurality of grid lines 4 extend along the x-direction and by a plurality of grid lines 4 that extend along the y-direction. The grid lines extending along the x-direction are parallel to each other and the grid lines extending the y-direction are parallel to each other. The grid lines extending along the x-direction and along the y-direction intersect each other under 90° degrees.

The carrier device 1 comprises at least two detection devices 6 which are arranged along a line 9. This means, the parts of the detection device, namely the wave source unit 7 and the wave receiver unit 8 are arranged on the line 9. Additionally, the hole 3 that is detected by the respective detection device is also arranged on the line 9. The detection devices 6 are arranged such that an angle between the line 9 and a grid line 4 of the grid structure 5 is between 35° to 55°, in particular between 40° to 50°, preferably 45° as shown in the FIG. 2*b*. The angle between the line 9 and the grid line 4 can correspond to the grid line 4 extending the x-direction or the grid line extending the y-direction.

As is evident from FIG. 2*b* the carrier device 1 can comprise further detection devices 6 that are arranged on a further line 11. The further line 11 is parallel to line 9.

Figure 3:
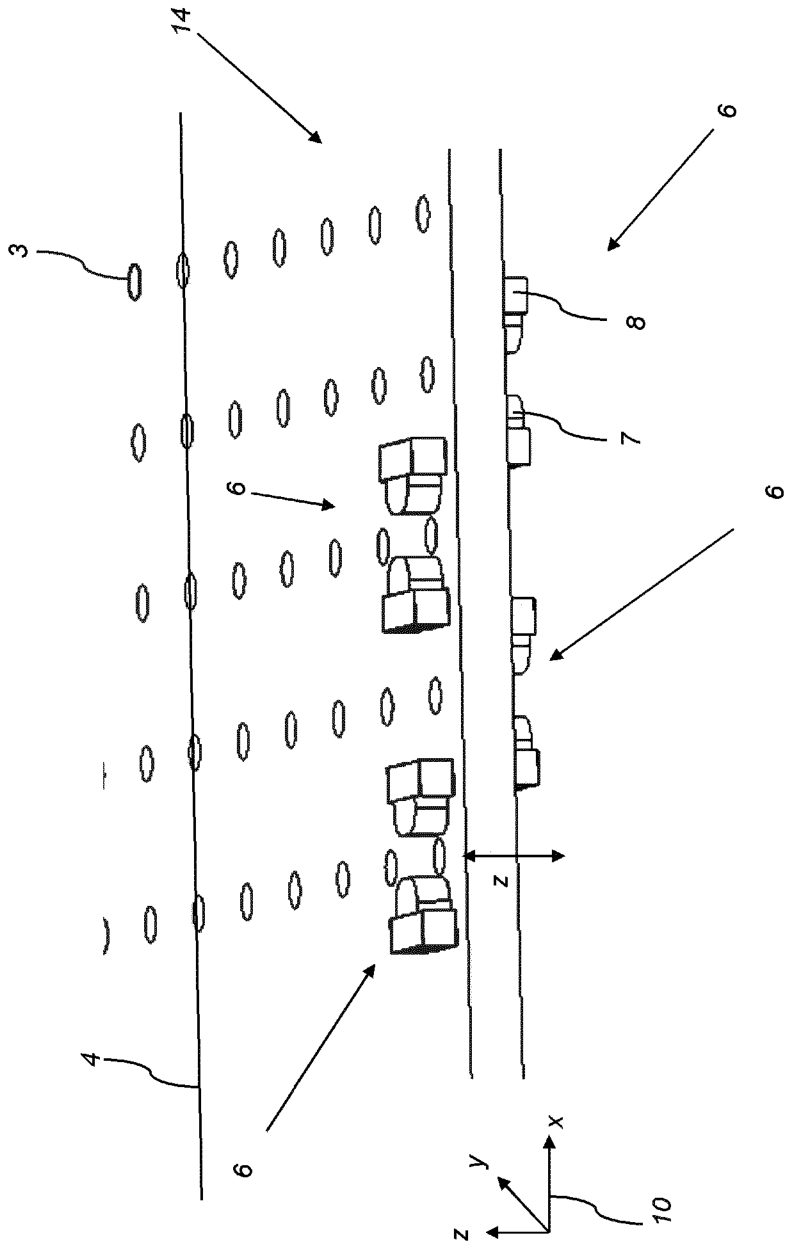
FIG. 3 shows a sectional side view of a carrier for the carrier device according another embodiment of the invention.

Additionally or alternatively, the detection devices 6 can be arranged such that the at least two detection devices 6 are arranged, in particular alternatingly, offset in a Cartesian coordinate system 10 z-coordinate direction, as shown in FIG. 3. FIG. 3 shows a perspective view on a part of the carrier device 1 according to another embodiment of the invention. In said embodiment the detection devices 6 that are arranged adjacent along the grid line 4 are arranged on different carrier device sides. In FIG. 3 a grid line 4 is shown that extends along the x-direction. However, the detection devices 6 can alternatively or additionally also be arranged alternatingly on different carrier devices sides when the grid line 4 extends along the y-direction.

The carrier device 1 of FIG. 2*a* is a printed circuit board. A carrier element 14 of the carrier device 1 carries electrical component portions 15 comprising electrical components 16 of the printed circuit board, such as active, passive or electromechanical components of a printed circuit board, and further comprises a through hole 18*a* and grasping portions 22. The grasping portion 22 allows for automated handling in an HTS workflow, in particular by using a robot arm for automated transport. The carrier device shown in FIG. 2*a* preferably has 384 holes 3. The number of holes 3 can be between 96 or more than 96 and 1536, in particular 384 holes 3.

A further electrical connector 17 is arranged on the carrier device 1 such that it is accessible from a carrier side 20 (see FIG. 4) that is opposite to another carrier side 21 facing to the dispensing head 31 of the dispensing device 2. Additionally or alternatively, the further electrical connector 17 is connectable to another control unit not shown in the figures. A user can for example easily connect his computer or another electronic device to the bottom or underside of the control unit, in particular the printed circuit board without having to remove the control unit or printed circuit board to establish a plug-and-socket connection. The electrical connector 17 can be a for example a pogopin; this has the advantage, that the electrical connector does not protrude from the surface of the carrier device 1.

Figure 4:
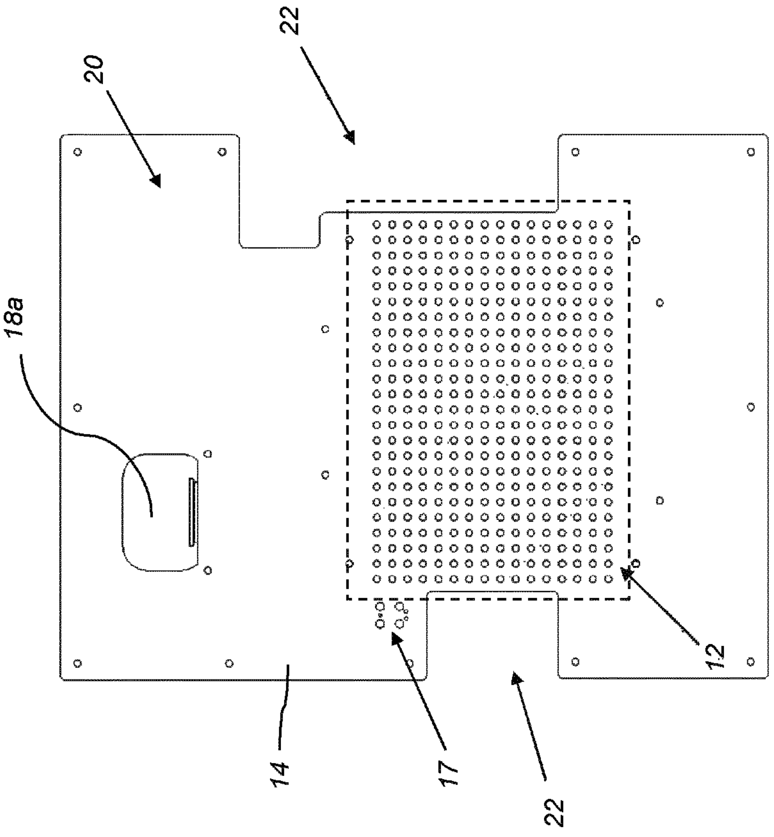
FIG. 4 shows a back view of the carrier device according to FIG. 2*a*.

FIG. 4 shows a back view of the carrier device 1 of the embodiment according to FIG. 2*a*. The printed circuit board, in particular the carrier element 14, comprises the through hole 18*a* and grasping portions 22. This allows for an easy connection to a further control unit, in particular to easily connect the carrier device with the control unit of the dispensing device 2. The corresponding through hole 18 allows for optimized mounting and connecting space of a connection allowing the carrier device 1 to communicate with the dispensing device 2.

Figure 5:
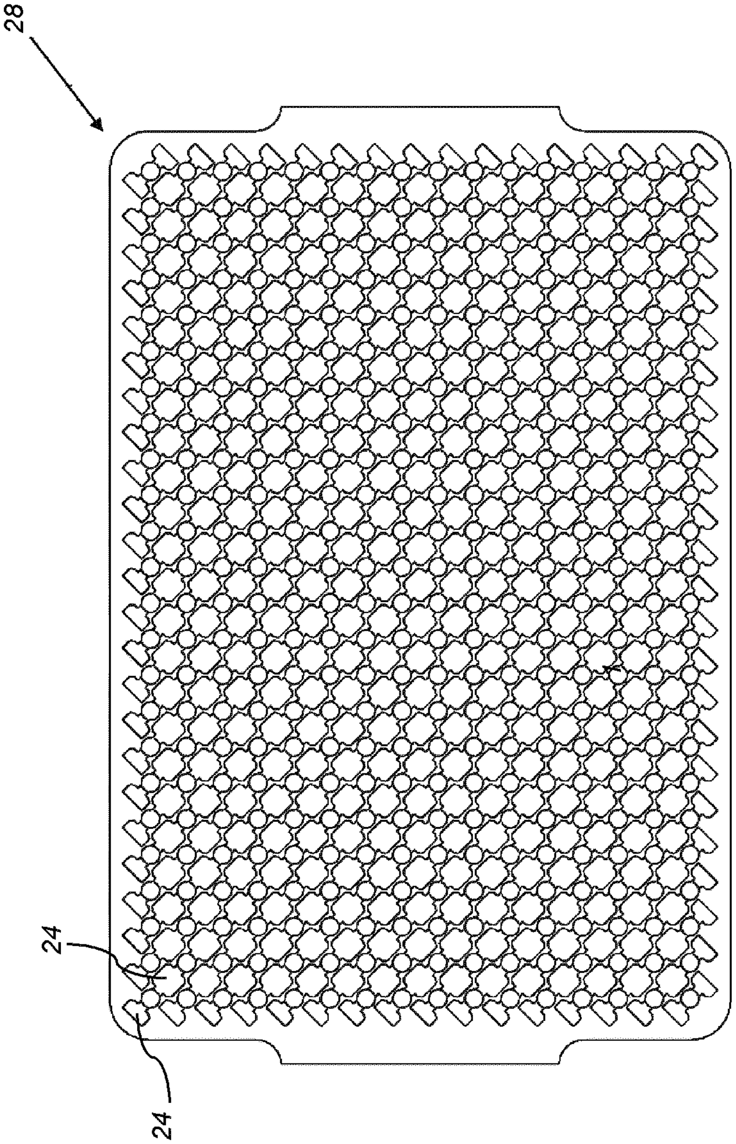
FIG. 5 shows a view on a lower side of the cover device of the carrier device.

FIG. 5 shows a view of a lower side of the cover device 28 of the carrier device 1. The cover device 28 comprises several recesses 24 for receiving the detection devices 6. In particular, the wave source unit 7 and the wave receiver unit 8 are arranged in a recess respectively. As is evident from FIG. 5, the recesses 24 are formed such that they are connected such with the hole that waves emitted by the wave source unit 7 passes the hole and is received by the wave receiver unit 8.

Figure 6:
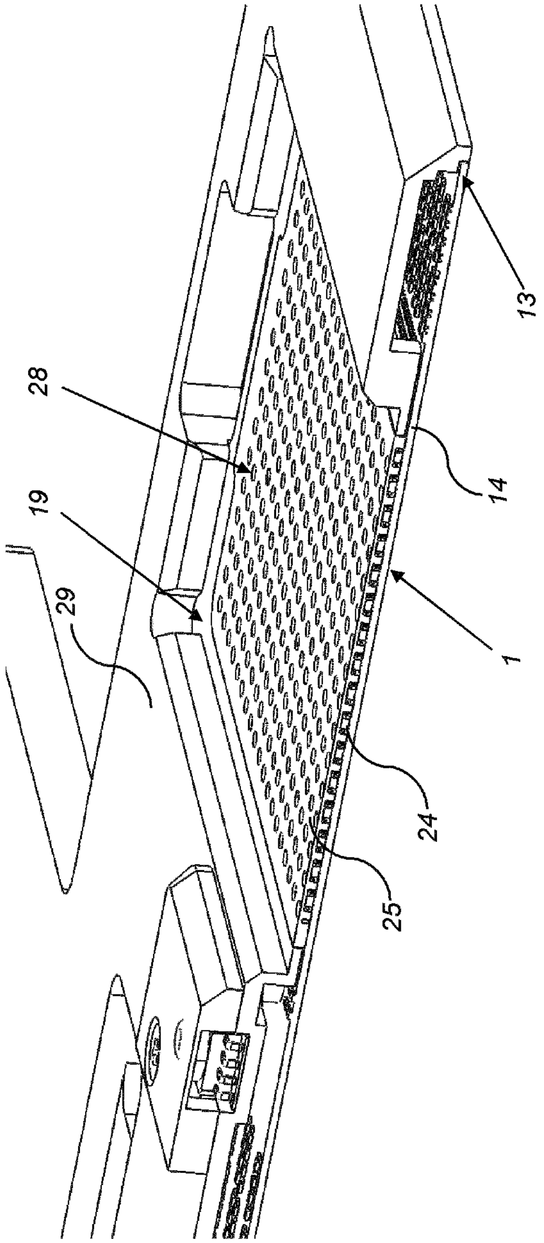
FIG. 6 shows a sectional view on a part of the source carrier to which the carrier device is attached.

As is evident in FIG. 6 the cover device 28 comprises on its upper side a recess wall 25 that separates the recess 24 from well carrier unit 30 that is attached to the cover device 8. In particular, the well carrier unit 30 is arranged on the upper side of the cover device 28.

FIG. 6 shows a sectional view on a part of the source carrier 29 to which the carrier device 1 is attached. In particular, the carrier device 1 is attached to a side of the source carrier 29 that faces away from the dispensing head 31 shown in FIG. 1. The carrier device 1 is arranged in a further recess 13 of the source carrier 28. The further recess 13 is configured such that the carrier device 1 is flush with the source carrier 29 when the carrier device 1 is arranged in the further recess 13. The carrier device 1 can be the embodiment shown in FIGS. 1, 2 and 4 or the embodiment shown in FIG. 3.

A cover device 28 is placed on the carrier device 1. In particular, the cover device 28 is arranged in the carrier through hole 19 of the source carrier 29. The cover device 28 covers at least the part of the cover devices 28 comprising the detection devices 6. Furthermore, the cover device 28 comprises several through holes that are arranged such that they are coaxially arranged with the hole 3 of the carrier device 1. Additionally the holes are arranged coaxially with the well outlet openings when the well carrier unit 30 is inserted into the carrier through hole 19 and thus arranged on the cover device 28 of the carrier device 1.

Figure 7:
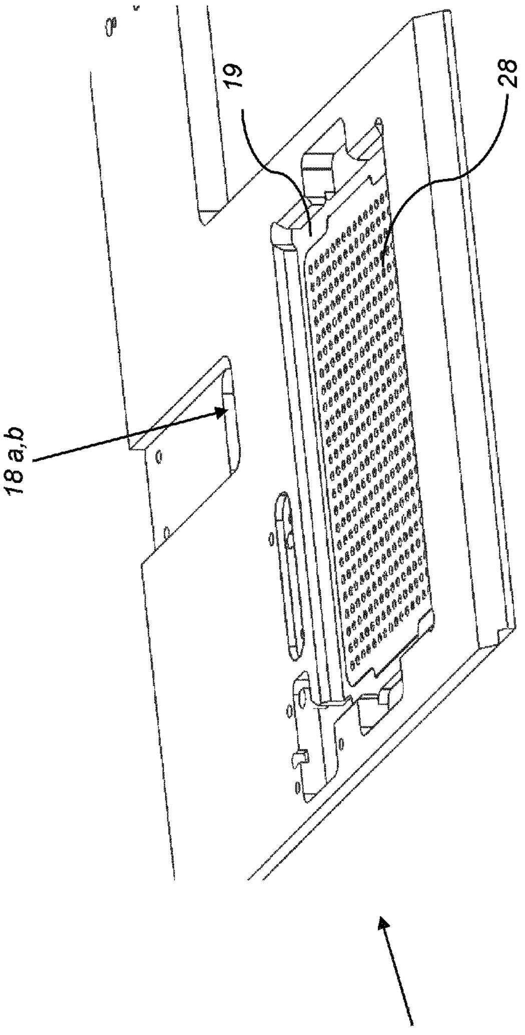
FIG. 7 shows a perspective representation of source carrier as shown in FIG. 5.
Figure 8:
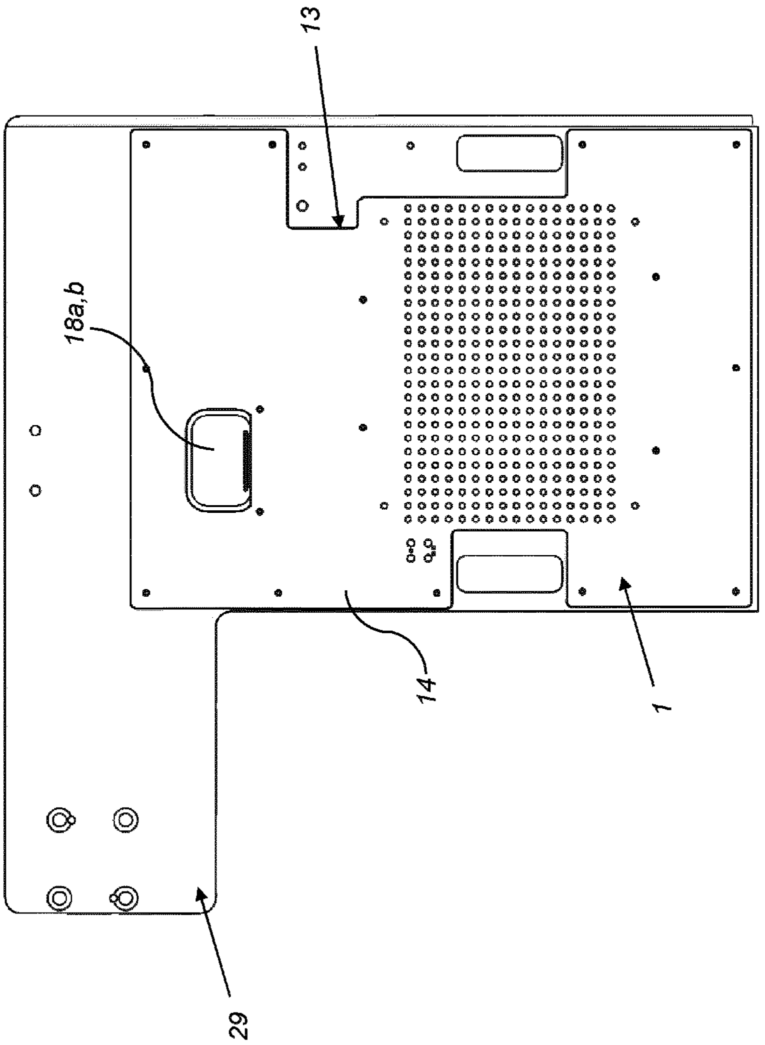
FIG. 8 shows a back view of the source carrier according FIG. 6.

FIG. 7 shows a perspective representation of the source carrier 29 of the embodiment shown in FIG. 6. The carrier device 1 is attached to the source carrier 29 and the cover device 28 is arranged on the carrier device 1 and/or arranged in the through hole 19. FIG. 8 shows a back view of the source carrier 29 according FIG. 6. The through hole 18*b* of the source carrier 29 is arranged coaxially to the through hole 18*a* of the carrier device 1.

Figure 9:
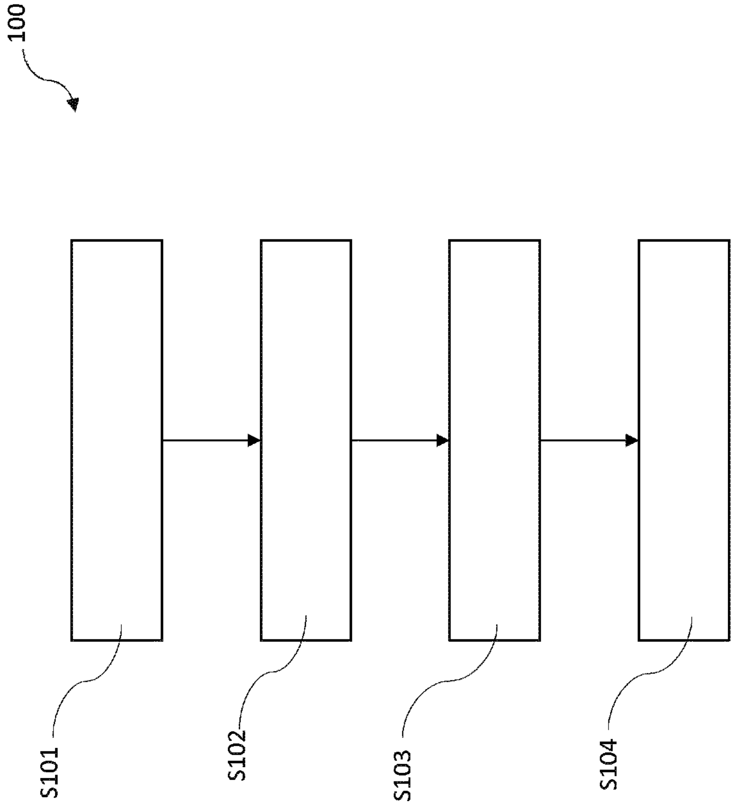
FIG. 9 shows a flow chart of a method for detection, counting and verification of at least one droplet according to an example.

FIG. 9 shows a flow chart of a method for detection, counting and/or verification according to an example.

Method 100 for detection, counting and/or verification of at least one droplet originating from at least one hole 3 of a carrier device 1, for each position of a hole 3 comprising the steps of identifying changes in light intensity to detect droplets S101, counting the number of droplets S102 and verifying the droplets S103. The method further comprises the step of communicating a signal to a control unit S104. Additionally, the method can comprise the step of outputting results in computer readable format S105 (not shown).

The method can further comprise a humidity control step and/or a temperature control step. Additionally or alternatively, the method can further comprise the step of data communication, in particular via a gateway connectivity 35, in particular an IOT gateway or ethernet gateway. Said ethernet gateway can preferably be an ethernet port which is connected via a connector such as a cable to a further control unit, such as an external computer. The cable can be easily connected to the ethernet port via through holes 18*a,b* of a source carrier 29 and the carrier device 1. The through holes 18*a,b* thus allow for an easy connection with a further control unit, such as an additional electronic device, such as a computer, in particular without having to disassemble the source carrier. This makes allows for very efficient and time saving data communication during an HTS workflow.

REFERENCE SIGNS

- 1 Carrier device
- 2 dispensing device
- 3 holes
- 4 grid lines
- 5 grid structure
- 6 detection devices
- 7 wave source unit
- 8 wave receiver unit
- 9 line
- 10 Cartesian coordinate system
- 11 further line
- 12 grid portion
- 13 further recess
- 14 carrier element
- 15 electrical component portion
- 16 electrical component
- 17 electrical connector
- 18*a,b* through hole
- 19 carrier through hole
- 20 carrier side
- 21 another carrier side
- 22 grasping portion
- 24 recess
- 25 recess wall
- 28 cover device
- 29 source carrier
- 30 well carrier unit
- 31 dispensing head
- 37 housing
- 38 grid
- 100 Method
- S101-S105 Steps of the method

The invention claimed is:

1. A carrier device for a dispensing device, wherein the carrier device comprises:

a plurality of holes that are arranged along grid lines of a Cartesian coordinate system x,y-coordinate grid structure; and a plurality of detection devices for detecting whether a dispensed liquid falls through a hole, wherein the detection device comprises a wave source unit configured to emit a wave and a wave receiver unit configured to receive the emitted wave, wherein at least two detection devices are arranged along a line;

wherein:

a. the detection devices are arranged such that an angle between the line and a grid line of the grid structure is between 35° to 55°; and/or b. the detection devices are arranged such that the at least two detection devices are arranged offset in a Cartesian coordinate system z-coordinate direction.

2. The carrier device according to claim 1, wherein at least two further detection devices are arranged along a further line wherein the line and the further line are parallel to each other.

3. The carrier device according to claim 1, wherein:

a. at least two holes are arranged along the line; and/or b. no detection device is arranged along a grid line; and/or c. the detection devices form a regular or an irregular pattern along the grid structure.

4. The carrier device according to claim 1, wherein the holes are arranged in a grid portion of the carrier device wherein:

a. a circumferential border of the grid portion is formed by the holes; and/or b. the grid portion has a rectangular shape.

5. The carrier device according to claim 1, wherein:

a. the wave source unit emits non-visible waves; and/or b. the waves emitted by the wave source unit comprise a wavelength between 780 nm to 1000 nm.

6. The carrier device according to claim 1, wherein:

a. the carrier device is a printed circuit board; and/or b. the carrier device comprises an electrical component portion comprising at least one electrical component wherein the electrical component portion is arranged adjacent to a grid portion of the carrier device; and/or c. no other electrical component than the detection device is arranged in the grid portion.

7. The carrier device according to claim 1, wherein the carrier device comprises an electrical connector and a through hole, wherein:
a. the electrical connector is connectable to the dispensing device; and/or
b. the electrical connector partly protrudes into the through hole.

8. The carrier device according to claim 7, wherein the carrier device comprises a further electrical connector, wherein:
a. the further electrical connector is arranged such that it is accessible from a carrier side that is opposite to another carrier side that faces towards a dispensing head; and/or
b. the further electrical connector is connectable to another control unit.

9. The carrier device according to claim 1, wherein the carrier device comprises a carrier element, wherein the carrier element comprises at least one grasping portion, wherein:
a. the grasping portion is arranged at a border of the carrier element; and/or
b. the grasping portion corresponds with an indentation of the carrier element.

10. The carrier device according claim 9, wherein:
a. the carrier device comprises a cover device for covering a part of the carrier element; or
b. the carrier device comprises a cover device for covering the carrier wherein the cover device comprises several through holes that are arranged coaxial to the holes when the cover device is arranged on the carrier element.

11. The carrier device according to claim 10, wherein:
a. the cover device comprises at least one recess for receiving the detection device; or
b. the cover device comprises at least one recess wherein the detection device is arranged in the at least one recess when the cover device is arranged on the carrier element.

12. The carrier device according to claim 11, wherein:
a. the recess is open towards the carrier element; and/or
b. the cover device comprises a recess wall separating the recess from a well carrier unit.

13. The carrier device according to claim 1, wherein the number of holes is between 97 and 1536.

14. A dispensing device for dispensing a liquid, comprising a source carrier configured to receive a well carrier unit, a dispensing head configured to apply a pressure to the well carrier unit for dispensing liquid and a carrier device according to claim 1.

15. The dispensing device according to claim 14, wherein the carrier device is arranged at a side of the source carrier that is opposite to the dispensing head.

16. The dispensing device according to claim 14, wherein:
a. the carrier device is arranged in a recess of the source carrier; or
b. the carrier device is arranged in a recess of the source carrier such that the carrier device is arranged flush with the source carrier.

17. The dispensing device according to claim 14, wherein:
a. the source carrier comprises a carrier through hole for receiving the well carrier unit; or
b. the source carrier comprises a carrier through hole for receiving the well carrier unit, wherein the well carrier unit is in contact with the carrier device when the well carrier unit is arranged in the carrier through hole.

18. The dispensing device according to claim 14, wherein:
a. the source carrier is configured to be moveable; and/or
b. the dispensing head is configured to be moveable.

19. The dispensing device according to claim 14, wherein the dispensing device comprises the well carrier unit, wherein a well for receiving liquid comprises an inlet opening for inserting liquid and an outlet opening for dispensing liquid.

20. A source carrier for a dispensing device according to claim 14, wherein the source carrier comprises a through hole for receiving an electrical connector of the carrier device.

* * * * *